(12) United States Patent
Vesterinen et al.

(10) Patent No.: US 9,723,531 B2
(45) Date of Patent: Aug. 1, 2017

(54) METHOD AND APPARATUS FOR IN SEQUENCE DELIVERY OF DOWNLINK LOCAL IP ACCESS (LIPA) PACKETS

(75) Inventors: Seppo Ilmari Vesterinen, Oulunsalo (FI); Gyorgy Tamas Wolfner, Budapest (HU)

(73) Assignee: Nokia Solutions and Networks Oy, Espoo (FI)

(*) Notice: Subject to any disclaimer, the term of this patent is extended or adjusted under 35 U.S.C. 154(b) by 222 days.

(21) Appl. No.: 13/985,631

(22) PCT Filed: Feb. 15, 2011

(86) PCT No.: PCT/EP2011/052243
§ 371 (c)(1),
(2), (4) Date: Sep. 9, 2013

(87) PCT Pub. No.: WO2012/110083
PCT Pub. Date: Aug. 23, 2012

(65) Prior Publication Data
US 2014/0003391 A1    Jan. 2, 2014

(51) Int. Cl.
*H04W 36/22* (2009.01)
*H04L 12/801* (2013.01)
*H04W 28/14* (2009.01)
*H04W 8/08* (2009.01)
*H04W 88/08* (2009.01)
*H04W 84/04* (2009.01)

(52) U.S. Cl.
CPC ............ *H04W 36/22* (2013.01); *H04L 47/34* (2013.01); *H04W 8/082* (2013.01); *H04W 28/14* (2013.01); *H04W 84/045* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2010/0215020 A1* | 8/2010 | Lee et al. | 370/331 |
| 2011/0103301 A1* | 5/2011 | Mueck | H04W 48/12 370/328 |
| 2011/0103310 A1* | 5/2011 | Stojanovski | H04L 12/66 370/328 |
| 2011/0261747 A1* | 10/2011 | Wang et al. | 370/315 |
| 2012/0020325 A1* | 1/2012 | Swamy | H04W 36/14 370/331 |
| 2012/0178416 A1* | 7/2012 | Miklos | H04L 29/12066 455/410 |

(Continued)

OTHER PUBLICATIONS

Intel Corporation, "LIPA downlink reordering", Jan. 21, 2011, G3PP TSG-RAN WG3#70bis doc No. R3-110111.*

(Continued)

*Primary Examiner* — Derrick Ferris
*Assistant Examiner* — Manuel Rangel
(74) *Attorney, Agent, or Firm* — Harrington & Smith (57) ABSTRACT

A method includes responsive to receiving a first packet of a plurality of packets at a first radio access node enabling said first radio access node to receive at least one other of said plurality of packets. The method further includes causing said first packet to be sent by said first radio access node to a user equipment before said at least one other of said plurality of packets is caused to be sent to said user equipment.

16 Claims, 7 Drawing Sheets

(56) References Cited

U.S. PATENT DOCUMENTS

| | | | | |
|---|---|---|---|---|
| 2012/0214445 A1* | 8/2012 | Stojanovski | .......... | H04L 63/164 455/411 |
| 2012/0269167 A1* | 10/2012 | Velev | ................ | H04W 36/0011 370/331 |
| 2013/0301610 A1* | 11/2013 | Ali | ........................ | H04W 36/08 370/331 |

OTHER PUBLICATIONS

3GPP Technical Report; "General Packet Radio Service (GPRS) enhancements for Evolved Universal Terrestrial Radio Access Network (E-UTRAN) access (Release 10)"; Jan. 2011; 3GPP TS 23.401 V10.2.1.*

3GPP Technical Report; "Local I P Access and Selected IP Traffic Offload (Release 10)"; Sep. 2010; 3GPP 23.829 v1.3.0.*

3GPP 23.829 V.1.3.0 (Sep. 2010), "$3^{rd}$ Generation Partnership Project; Technical Specification Group Services and System Aspects; Local IP Access and Selected IP Traffic Offload (Release 10)", 44 pgs.

3GPF TS 23.401 V10.2.0 (Dec. 2010), "$3^{rd}$ Generation Partnership Project; Technical Specification Group Services and System Aspects; General Packet Radio Service (GPORS) enhancements for Evolved Universal Terrestrial Radio Access Network (E-UTRAN) access (Release 10)", 59 pgs.

3GPP TSG-RAN WG3 #70bis, Jan. 17-21, 2011, Dublin, Ireland, R3-110111, "LIPA downlink reordering", Intel Corporation, 3 pgs.

* cited by examiner

METHOD AND APPARATUS FOR IN SEQUENCE DELIVERY OF DOWNLINK LOCAL IP ACCESS (LIPA) PACKETS

The present invention relates to a method and apparatus. Some embodiments may be used in a Local IP access environment.

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. For example, the standards, specifications and related protocols can define the manner how communication devices can access the communication system and how various aspects of communication shall be implemented between communicating devices. A communication can be carried on wired or wireless carriers. In a wireless communication system at least a part of the communication between at least two stations occurs over a wireless link.

Examples of wireless systems include public land mobile networks (PLMN) such as cellular networks, satellite based communication systems and different wireless local networks, for example wireless local area networks (WLAN). A wireless system can be divided into cells, and hence these are often referred to as cellular systems. A cell is provided by a base station. Cells can have different shapes and sizes. A cell can also be divided into sectors or a cell can be a single sector. Regardless of the shape and size of the cell providing access for a user, and whether the access is provided via a sector of a cell or a cell, such area can be called radio service area or access area. Neighbouring radio service areas typically overlap, and thus a communication in an area can listen to more than one base station.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station of an access network and/or another user equipment. The communication device may access a carrier provided by a station, for example a base station, and transmit and/or receive communications on the carrier.

A feature of wireless communication devices is that they offer mobility for the users thereof. A mobile communication device, or mobile device for short, may also be transferred, or handed over, from a base station to another and even between base stations belonging to different systems.

$3^{rd}$ Generation Partnership Project (3GPP) is standardizing an architecture that is known as the long-term evolution (LTE) of the Universal Mobile Telecommunications System (UMTS) radio-access technology. The aim is to achieve, inter alia, reduced latency, higher user data rates, improved system capacity and coverage, and reduced cost for the operator. A further development of the LTE is referred to herein as LTE-Advanced (LTE-A). The LTE-Advanced aims to provide further enhanced services by means of even higher data rates and lower latency with reduced cost. The various development stages of the 3GPP LTE specifications are referred to as releases.

An aspect of controlling communications by mobile devices is known as mobility management. Mobility management provides control of active mobile devices moving within a certain area. In cellular systems mobility management is provided by a particular control entity. For example, in LTE each access system is provided with a mobility management entity (MME). A MME control node is involved, among other things, in idle mode user equipment tracking and paging procedures including retransmissions, in bearer activation/deactivation processes and in choosing a serving gateway (SGW) for a user equipment at the initial attach and at time of intra-LTE handover involving core network (CN) node relocation.

In LTE-Advanced the network nodes can be wide area network nodes such as a macro eNode B (eNB) which may, for example, provide coverage for an entire cell. Alternatively in LTE-Advanced, network nodes can be small area network nodes such as Home eNBs (HeNB) or pico eNodeBs (pico-eNB). HeNBs may be configured to support local offload and may support any UE or UEs belonging to a closed subscriber group (CSG) or an open subscriber group (OSG). Pico eNBs can, for example, be configured to extend the range of a cell. In some instances a combination of wide area network nodes and small area network nodes can be deployed using the same frequency carriers (e.g. co-channel deployment).

3GPP Rel-10 introduces Local IP Access (LIPA) functionality for E-UTRAN and UTRAN systems. The LIPA functionality provides the ability for a UE to access a local area network and the internet using the air interface of a small area node, for example an HeNB. In particular, the LIPA functionality may be provided to the UE from a local gateway (L-GW) which is collocated with the HeNB. Using LIPA functionality can provide greater performance, permit meshing of a home network and a mobile operator network and enable offloading of data traffic from the mobile operator's packet core network (PCN). LIPA functionality can allow a UE to use the local IP backhaul of the HeNB for one or more data bearers.

STATEMENT OF INVENTION

According to one aspect, there is provided a method comprising responsive to receiving a first packet of a plurality of packets at a first radio access node enabling said first radio access node to receive at least one other of said plurality of packets; and causing said first packet to be sent by said first radio access node to a user equipment before said at least one other of said plurality of packets is caused to be sent to said user equipment.

According to another aspect, there is provided an apparatus comprising at least one processor and at least one memory including computer program code, the at least one memory and computer program code configured to with the at least one processor cause the apparatus at least to responsive to receiving a first packet of a plurality of packets, enabling said apparatus to receive at least one other of said plurality of packets; and causing said first packet to be sent to a user equipment before said at least one other of said plurality of packets is caused to be sent to said user equipment.

Various other aspects and further embodiments are also described in the following detailed description and in the attached claims.

The invention will now be described in further detail, by way of example only, with reference to the following examples and accompanying drawings, in which.

In the following, certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

A non-limiting example of the recent developments in communication systems is the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved NodeBs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices.

Figure 1:
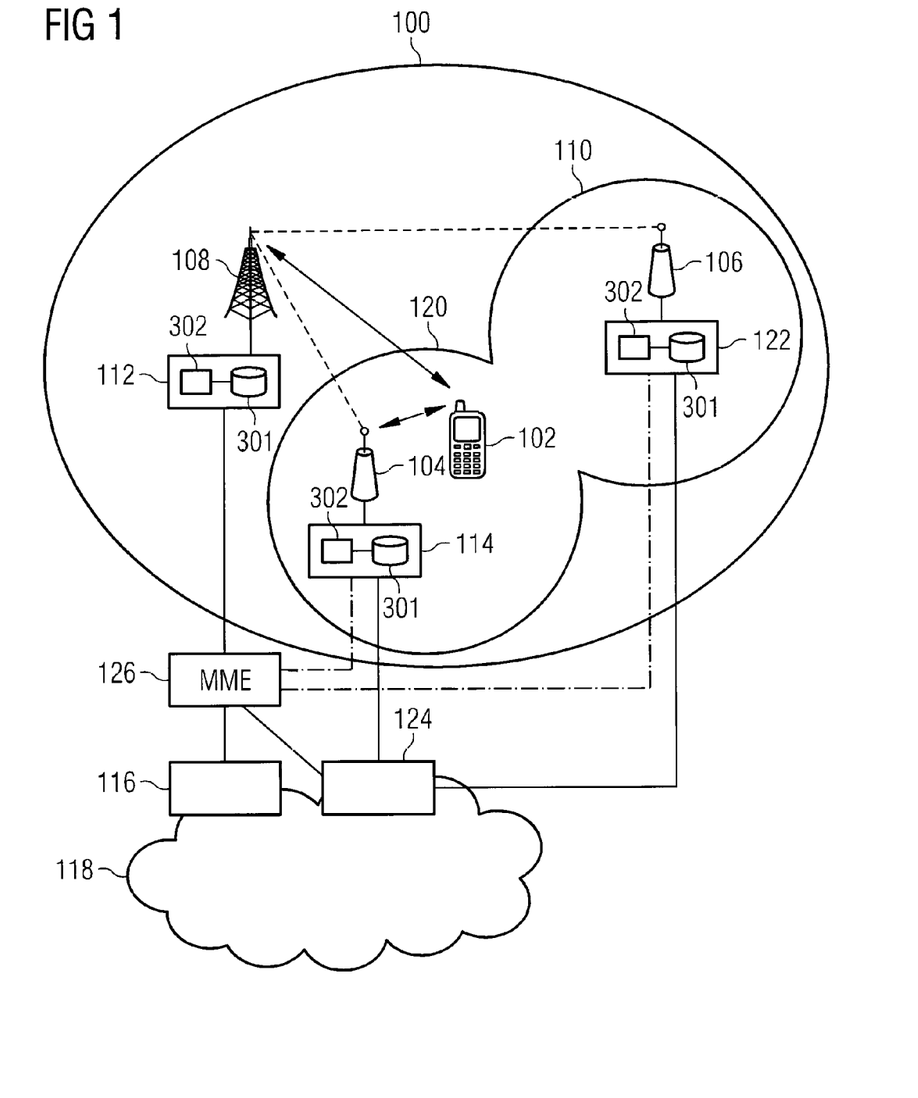
FIG. 1 shows a schematic diagram of a network according to some embodiments.

A mobile communication device or user equipment 102 is typically provided wireless access via at least one base station or similar wireless transmitter and/or receiver node of an access system. In FIG. 1 three neighbouring and overlapping access systems or radio service areas 100, 110 and 120 are shown being provided by access nodes or base stations 104, 106, and 108 (eNBs in LTE). In some embodiments access systems 110 and 120 are part of the same home or local network. In some embodiments the home/local network can be an intranet. In some embodiments the home/local intranet can comprise any number of access nodes.

However, it is noted that instead of three access systems, any number of access systems can be provided in a communication system. An access system can be provided by a cell of a cellular system or another system enabling a communication device to access a communication system. A base station site 104, 106, 108 can provide one or more cells. A base station can provide a one or more sectors, for example three radio sectors, each sector providing a cell or a subarea of a cell. All sectors within a cell can be served by the same base station. Thus a base station can provide one or more radio service areas. Each mobile communication device 102 and base station 104, 106, and 108 may have one or more radio channels open at the same time and may send signals to and/or receive signals from more than one source.

Base stations 104, 106, 108 are typically controlled by at least one appropriate control apparatus. The base stations 104, 106 and 108 can be respectively controlled by control apparatus 112, 114, 122 and so as to enable operation thereof and management of mobile communication device 102 in communication with the base stations 104, 106, 108. The control apparatus 114 can be interconnected with other control entities such as control apparatus 112, 122 or any other control apparatuses. In some embodiments the control apparatus 112, 114, 122 is integral with the respective base station 108, 104, 106. That is, the control functions can be carried out by the base station, for example an eNB or a HeNB.

Figure 3:
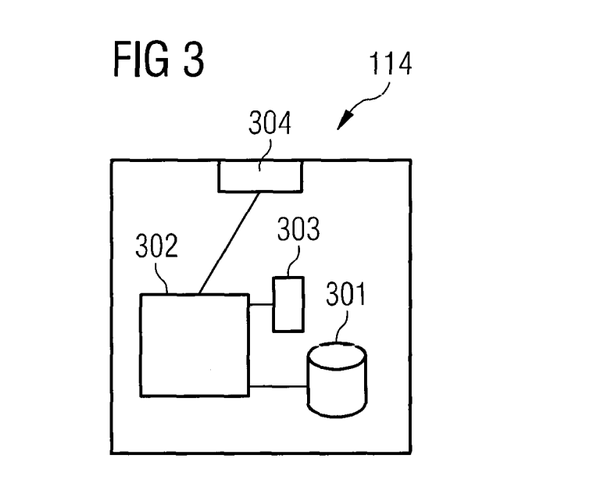
FIG. 3 shows a schematic diagram of a control apparatus according to some embodiments.

FIG. 3 shows an example of a control apparatus 114 for a communication system, which for example can be coupled and/or integral with the base station for controlling the station of an access system. In some embodiments the base stations 104, 106, and 108 comprise a separate control apparatuses 112, 114, 122. In other embodiments the control apparatus can be another network element. The control apparatus 114 can be arranged to provide control of communications with mobile communication devices 102 that are in the service area of the system. The control apparatus 114 can be configured to provide control functions in association with generation and communication of transmission patterns and other related information and for muting signals by means of the data processing facility in accordance with certain embodiments described below. For this purpose the control apparatus 114 comprises at least one memory 301, at least one data processing unit 302, 303 and an input/output interface 304. Via the interface the control apparatus can be coupled to a receiver and a transmitter of the base station. The control apparatus 114 can be configured to execute an appropriate software code to provide the control functions. In some embodiments the control apparatus 114 and functions may be distributed between a plurality of control units.

Referring to FIG. 1, the cell borders or edges of the base stations 104, 106, 108 are schematically shown for illustration purposes only in FIG. 1. It shall be understood that the sizes and shapes of the cells or other radio service areas may vary considerably from the similarly sized omni-directional shapes of FIG. 1. In particular, FIG. 1 depicts a wide area base station 108, which can be a macro-eNB. The macro-eNB 108 transmits and receives data over the entire coverage of the cell 100. FIG. 1 also shows two smaller base stations or access points. In some embodiments the access points are Home eNBs (HeNB) 104, 106, femto eNBs or pico eNBs. In the following, reference is made to the HeNBs. However, those HeNBs can of course alternatively be replaced by femto eNBs, pico eNBs, macro-eNBs or any other suitable access node.

The coverage of the HeNBs 104, 106 may generally be smaller than the coverage of the wide area base station 108. The coverage provided by the HeNBs 104 and 106 can overlap with the coverage provided by the macro-eNB 108 or to increase the capacity within certain limited area of macro coverage. HeNBs 104, 106 can be used to extend coverage of the macro-eNB 106 outside the original cell coverage 100 of the macro-eNB 108. The HeNB can also be used to provide cell coverage in "gaps" or "shadows" where there is no coverage within the existing cell 100.

In some embodiments, the HeNBs 104, 106 can provide services to only mobile communication devices 104 which are members of a closed subscriber group (CSG). Alternatively the HeNB 108 can provide services to any mobile communication devices which are within the local area of the HeNBs 104, 106. In some embodiments an HeNB 108 can be configured for open access whereby any mobile communication device 1 in the coverage area of the HeNB 104, 106 can access the HeNB 104, 106. In some embodiments the HeNB 104, 106 may alternatively or additionally provide hybrid access whereby all mobile communication devices can access the HeNB 104, 106, but mobile communication devices 102 which are members of a CSG at the HeNB 104, 106 have priority over other mobile communication devices which are not members of the CSG. This priority can allow priority for service access in case of cell congestion or it can allow for dedicated services in the HeNB like local IP access rights to a local data server.

The mobile communication device 102 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

From time to time, mobile communication devices move from the coverage area of one base station to the coverage area of another base station. Controlling communications of mobile communication devices is known as mobility management. Mobility management provides control of active mobile devices moving within a certain area. In cellular systems mobility management is provided by a particular control entity. For example, in LTE each access system is provided with a mobility management entity (MME) 126. A MME control node 126 can be involved, among other things, in idle mode user equipment tracking and paging procedures including retransmissions, in bearer activation/deactivation processes and in choosing a serving gateway (SGW) 124 for a user equipment at the initial attach and at time of intra-LTE handover involving core network (CN) node relocation. The S-GW 124 can be connected to the MME 126 as shown by the dotted lines between the HeNBs 104, 106 and the MME 126. The S-GW 124 can also be connected to the other network(s) 118 such as external IP networks as shown in FIG. 1.

In FIG. 1 the base stations 104, 106, 108 of the access systems can be connected to one or more wider communications networks 118. The wider communications network(s) 118 can be one or more networks or a combination of networks. The wider communications networks 118 can be any of the following: regional access network; an operator's national IP backbone network; the internet; or any other suitable external IP network. The control apparatus 112 or other network entity may be provided for coordinating the operation of the access systems. A gateway function, such as a serving GPRS support node (SGSN) 116, may also be provided to connect to another network via the network 118.

Figure 7:
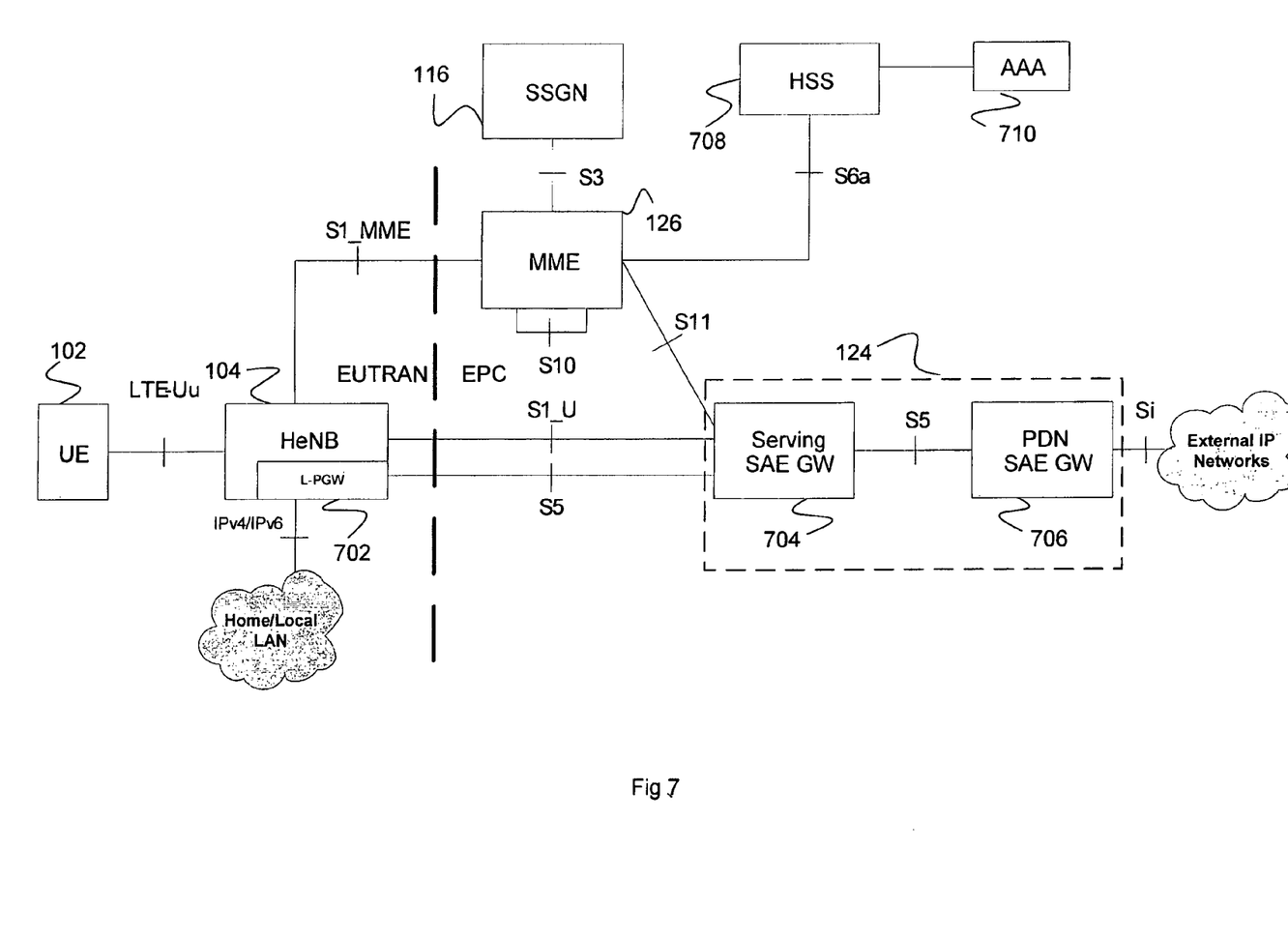
FIG. 7 illustrates a schematic representation of a local IP access architecture having a collocated L-GW in a HeNB according to some embodiments.

In some embodiments the HeNBs 104 and 106 can also be connected to the other network(s) 118 by the same gateway function 116 as the eNB 108 or additionally or alternatively by separate gateway function(s). In some embodiments the HeNBs 104, 106 comprises a collocated gateway function, that is situated in the same place as the HeNB. For the purposes of clarity, FIG. 1 does not show the collocated gateway function. In some embodiments the collocated gateway function is a local gateway (L-GW). The L-GW 702 is shown in FIG. 7, which is discussed in further detail below. The L-GW 702 can provide local IP access to a Home or Local LAN such as a company intranet. The L-GW 702 can allow the UE 102 access to information only accessible on the company intranet and/or other services such as printing, file transfer, email and other similar enterprise services.

In some embodiments the HeNBs 104, 106 can also provide local offload of capacity for the mobile communication device 102. The provision of local offload will now be discussed with reference to FIG. 7. FIG. 7 illustrates a schematic representation of a local IP access architecture having a collocated L-GW in the HeNB 104. The same reference numbers have been used in FIG. 7 for similar elements shown in FIG. 1.

Before discussing the provision of local offload with the L-GW the architecture of the local IP access is discussed for a better understanding of the interfaces and network entities involved. In some embodiments, the UE 102 can be connected to the HeNB 104 via a Uu interface. The HeNB 104 is then connected to the MME 126 via S1_MME interface and via a S-GW 124 with S1_U and S5 interfaces.

FIG. 7 shows the EUTRAN part of the network (including the HeNB 104) and the EPC (Evolved packet core) part of the network (including the network elements such as the MME 126). The separation between the EUTRAN and EPC parts is shown with the vertical dotted line. The MME 126 is connected to the SSGN 116 and a home subscriber server (HSS) 708 respectively via a S3 interface and a S6a interface. The HSS 708 can then be connected to an authentication, authorization and accounting server (AAA) 710.

As previously mentioned in some embodiments the L-GW 702 can be collocated with the HeNB 104. The L-GW 702 is a local PDN gateway which uses the S5 control interface with the S-GW 124 of the EPC. In some embodiments the MME 126 can control the L-GW 702 via the S-GW 124. The S-GW 124 comprises a serving system architecture evolution (SAE) gateway 704 and a PDN SAE gateway 706. The PDN SAE Gateway 706 is connected to external IP networks via a Si interface. The Serving SAW gateway 704 is connected to the MME 126 via a S11 interface.

The L-GW 702 can establish a connection with a home/local network over an interface, such as IPv4/IPv6. This means that the UE 102 can establish a local IP access (LIPA) bearer connection to the home/local network with the L-GW. In this way the UE 102 can access the home/local network and associated services. This means that data traffic is off-loaded from the PCN because the UE 102 does not access the home/local network via external IP networks (e.g. the internet). Instead the UE 102 accesses the home/local network using the connection via the L-GW 702 collocated in the HeNB 104.

Returning to FIG. 1, the base stations 104, 106, 108 can be connected to each other by a communication link (not shown) for sending and receiving data. The communication link can be any suitable means for sending and receiving data between the base stations 104, 106 and 108 and in some embodiments the communication link is an X2 link.

The other network(s) 118 may be any appropriate network. A wider communication system may thus be provided by one or more interconnect networks and the elements thereof, and one or more gateways may be provided for interconnecting various networks.

Figure 2:
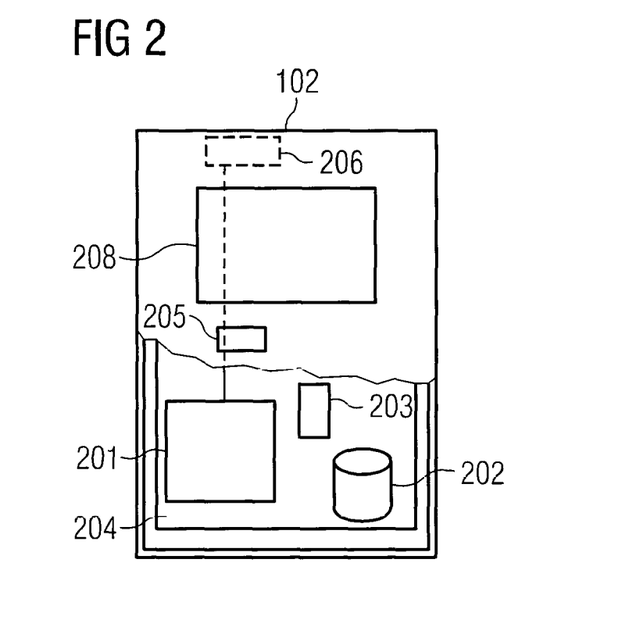
FIG. 2 shows a schematic diagram of a mobile communication device according to some embodiments.

The mobile communication devices shown in FIG. 1 will now be described in more detail with reference to FIG. 2. FIG. 2 shows a schematic, partially sectioned view of a communication device 102 that a user can use for communication. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The mobile communication device 102 may receive signals over an air interface via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

The mobile communication device 102 can be provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 4:
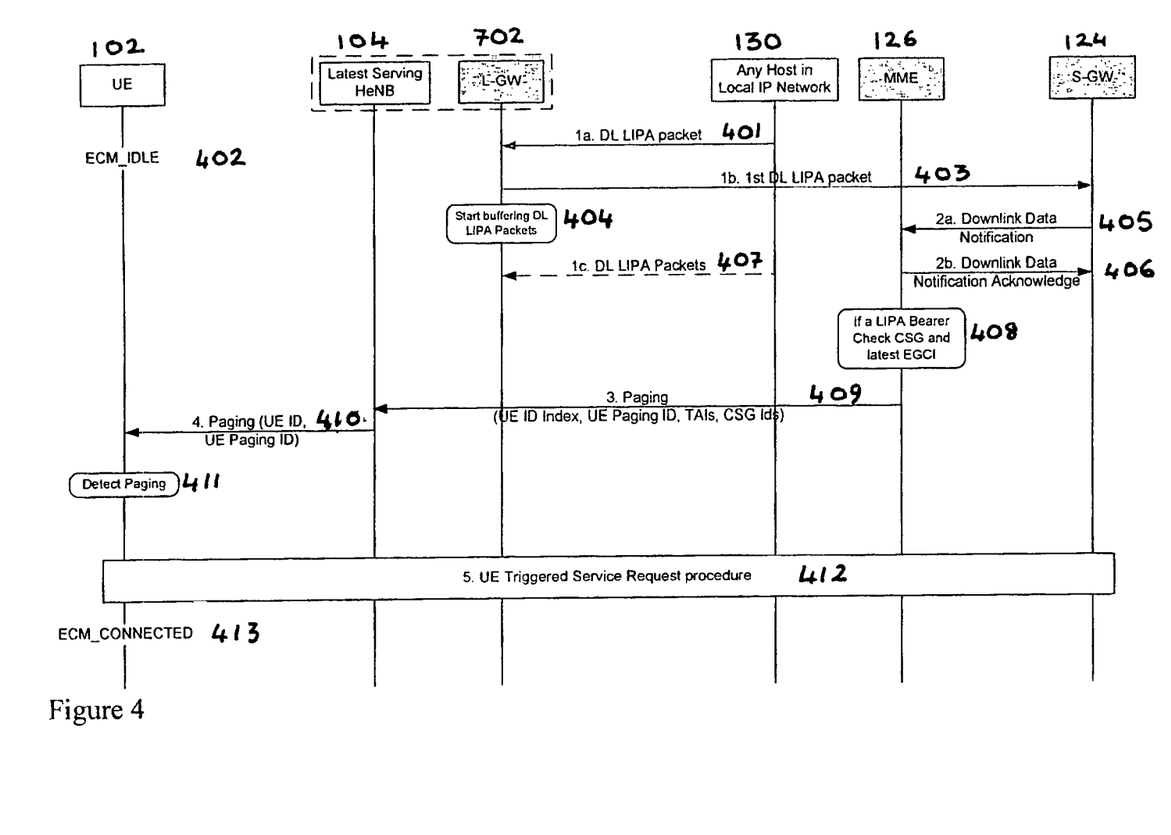
FIG. 4 illustrates a signalling diagram of a network triggered service request procedure.

The 3GPP specification TS 23.401 version 10.2.0 specifies a network triggered service request procedure in the context of an LIPA arrangement. In particular, the LIPA downlink paging is specified as follows if the user equipment is in the ECM (EPS (evolved packet system) connection management)-IDLE mode. This is illustrated in FIG. 4.

As referenced by 402, the user equipment is in the ECM-IDLE state.

In step 401, a downlink LIPA packet is sent from a source which may for example be any host 130 in a local IP network. The downlink LIPA packet is received by the L-GW 702.

As the UE is in the ECM-IDLE state, the L-GW 702 sends the first downlink user packet to the serving gateway 124. This is referenced 403.

As referenced by 404, the L-GW 702 will start buffering all other downlink user packets, that is the second and subsequent packets from the host 130.

As referenced 405, the S-GW 124 will send a downlink data notification to the MME 126 to trigger the MME 126 to page the UE 102.

This downlink data notification is acknowledged by the MME 126 to the S-GW 124, as referenced 406.

As schematically shown by reference 407, the host in the local IP network 130 continues to send downlink LIPA packets to the L-GW 702. This may occur at the same time as the downlink data notification process and indeed may continue as long as the host 130 has downlink LIPA packets to be provided to the L-GW 702.

After the downlink data notification acknowledgment, the MME 126 will, if there is a LIPA bearer, check the CSG (closed subscriber group) and latest E-GCI (E-UTRAN global cell identifier). This is referenced 408.

As referenced 409, the MME 126 sends a paging request to the serving HeNB. This paging request may include one or more of: user equipment identity (UE ID) index; UE paging identity (ID); TAIs (tracking area identity); CSG IDs or the like.

Responsive to receiving this paging request from the MME, the serving HeNB sends a paging request to the user equipment 102. The paging request may comprise the UE's ID and the UE's Paging ID. This is referenced 410.

As referenced 411, the user equipment detects the paging request.

As referenced 412, this triggers the user equipment triggered service request procedure which may involve several of the entities.

As referenced 413, the user equipment is ECM connected.

In 3GPP Release 10, there is a limitation that a user equipment is allowed to establish and use an LIPA PDN (packet data network) connection only via a HeNB supporting CSG to which the UEs LIPA server subscription is associated. This Release also specifies that for the L-GW for LIPA, this L-GW is co-located with the HeNB which means that the user equipment can continue the LIPA service only if it reconnects to the same HeNB/L-GW after it is paged.

As shown in FIG. 4, the first downlink LIPA packet is delivered to the S-GW placed in the core network in order to trigger the MME to page the user equipment. All other LIPA downlink user packets are buffered at the L-GW. This means that when the user equipment has moved to the ECM-connected mode, the HeNB must receive the first LIPA downlink packet from the S-GW over the S1-u interface and the rest of the downlink packets by using a node internal link between the HeNB and the L-GW.

Figure 5:
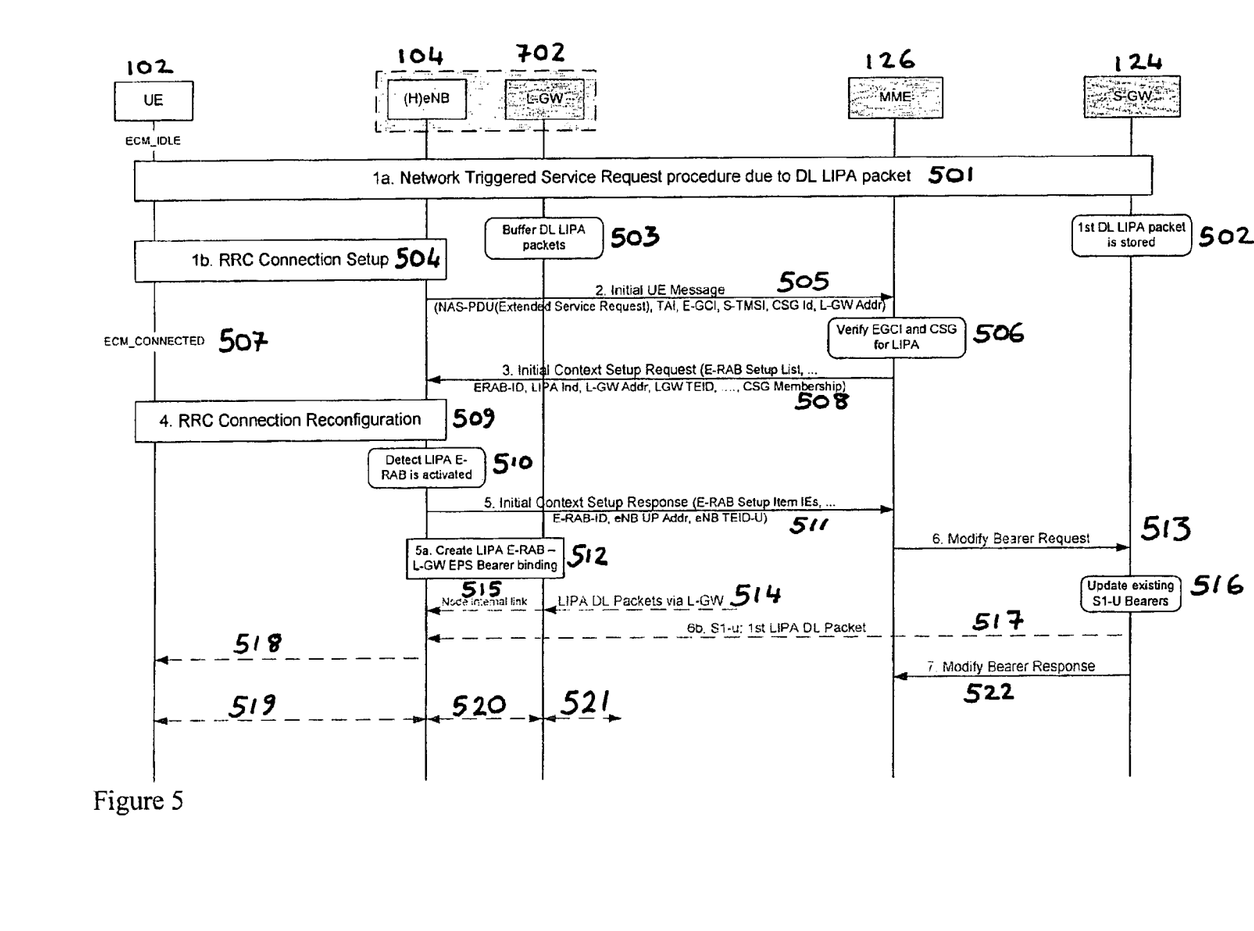
FIG. 5 illustrates a signalling UE triggered service request procedure after the UE is paged.

Reference is now made to FIG. 5 which shows a problem with the in sequence delivery of the downlink LIPA packets in the HeNB. In particular, FIG. 5 shows the procedure once the Network triggered service request procedure has been activated after the UE is paged. The Network Triggered Service Request procedure is initiated when somebody tries to connect to a UE that is in Idle mode. An arriving downlink data packet destined for the UE triggers paging that wakes up the UE that detects it is paged. After this the network triggered procedure continues with the same step as the UE triggered service request procedure. Another way to initiate UE Triggered Service Request procedure is that some application in the UE needs to establish a connection to some other peer.

In the step referenced 501, the network triggered service request procedure due to the downlink LIPA packet is triggered. This is the same as the UE triggered service request procedure reference 412 in FIG. 4.

It should be noted that the first DL LIPA packet is stored in the S-GW 124. This is referenced 502.

As referenced 503, the downlink LIPA packets subsequent to the first packets are stored in the L-GW 702.

As referenced 504, a RRC (radio resource control) connection setup procedure is performed between the user equipment 102 and the HeNB 104.

After this RRC connection set up procedure, the UE will be in the ECM-CONNECTED STATE as referenced 507.

As referenced 505, an initial UE message is forwarded from the HeNB 104 to the MME 126. This may include one or more of the NAS-PDU (Non Access Stratum-packet data unit. This is a protocol between the UE and the MME where NAS protocol messages are transported in NAS-PDU "containers"), the TAI, the E-GCI the S-TMSI (S-temporary mobile subscriber identity), the CSG-ID and the L-GW address.

As referenced 506, the MME will verify the EGCI and CSG for the LIPA.

Responsive thereto, as referenced 508, the MME 126 will send an initial context setup request. This may include one or more of the following: E-RAB (E-UTRAN radio access bearer) setup list: E-RAB-ID, LIPA index, L-GW address, L-GW TEID (tunnel end point identifier) and CSG membership. Thus the HeNB receives from the MME the initial UE context setup request message which includes the E-RABs to be setup list.

Responsive thereto and as referenced 509, the user equipment 102 and HeNB 104 perform an RRC connection reconfiguration procedure. The RRC connection reconfiguration configures the radio bearers.

As referenced 510, the HeNB 104 detects that the LIPA E-RAB is activated.

In response thereto, the HeNB 104 sends an initial context setup response to the MME 126. This is referenced 511. The response may include one or more of the E-RAB setup items IEs (information elements), E-RAB-ID, eNB UP (user plane) address, and eNB TEID-U. Thus, the HeNB responds to the MME with the E-RAB setup list including the S1-u downlink channel end point address and the TEID for each E-RAB The MME 126 sends a modified bearer request to the S-GW 124. This is referenced 513. The S-GW should receive the S1-u downlink channel end point information in the modified bearer request before it can start delivery of its buffered downlink packets which, in this case, is only the first packet.

Responsive to this, the S-GW 124 updates the existing S1-u bearers, as referenced 516.

Responsive to the initial context setup response, the HeNB 104 and the L-GW 702 create an LIPA E-RAB/L-GW EPS bearer binding as referenced 512. This sets up an internal link between the L-GW and the HeNB. Thus, the HeNB establishes a node internal link towards its co-located L-GW and creates a binding between the LIPA E-RAB and the L-GW EPS bearer context accordingly.

As referenced 514, the LIPA downlink packets are received by L-GW. This is as for example shown in FIG. 4. These packets are delivered to the HeNB 104 via the node internal link as referenced 515.

Steps 512, 515 and 514 generally take place in parallel to steps 513 and 516.

In step 517, the S-GW 124 sends via the S1-u interface the first LIPA downlink packet to the HeNB.

This first packet may be sent to the user equipment and this is referenced 518.

As referenced 521, packets may be sent/received from, for example, a host in the local IP network. Packets which are received from the L-GW are delivered to the HeNB and vice versa. This is referenced 520. As referenced 519, packets may be exchanged between the UE 102 and the HeNB 104.

It should be appreciated that after the first LIPA downlink packet has been sent via the S-GW 124, the S-GW 124 may send a modified bearer response message to the MME 126. This is referenced 522.

As indicated by reference 513, the S-GW must receive the S1-u downlink channel end point information in the modified bearer request before it can start delivery of its buffered downlink packets which, in this case, is only the first packet. This means that the node internal link from the L-GW to the HeNB is ready to deliver the locally buffered LIPA downlink packets earlier than the S1-u downlink data path configuration is completed between the S-GW and the HeNB. Typically, the buffered local packets (the second and subsequent packets) may be ready for delivery tens of milliseconds earlier than the first packet. This is because of the transport and processing delays associated with the signalling referenced 511 and 513. Also, the transport delay for the delivery of the packet should also be added to the total delay of the first packet.

Thus, the first LIPA downlink packet from the S-GW may arrive much later at the HeNB than the locally buffered LIPA downlink packets from the L-GW.

Figure 6:
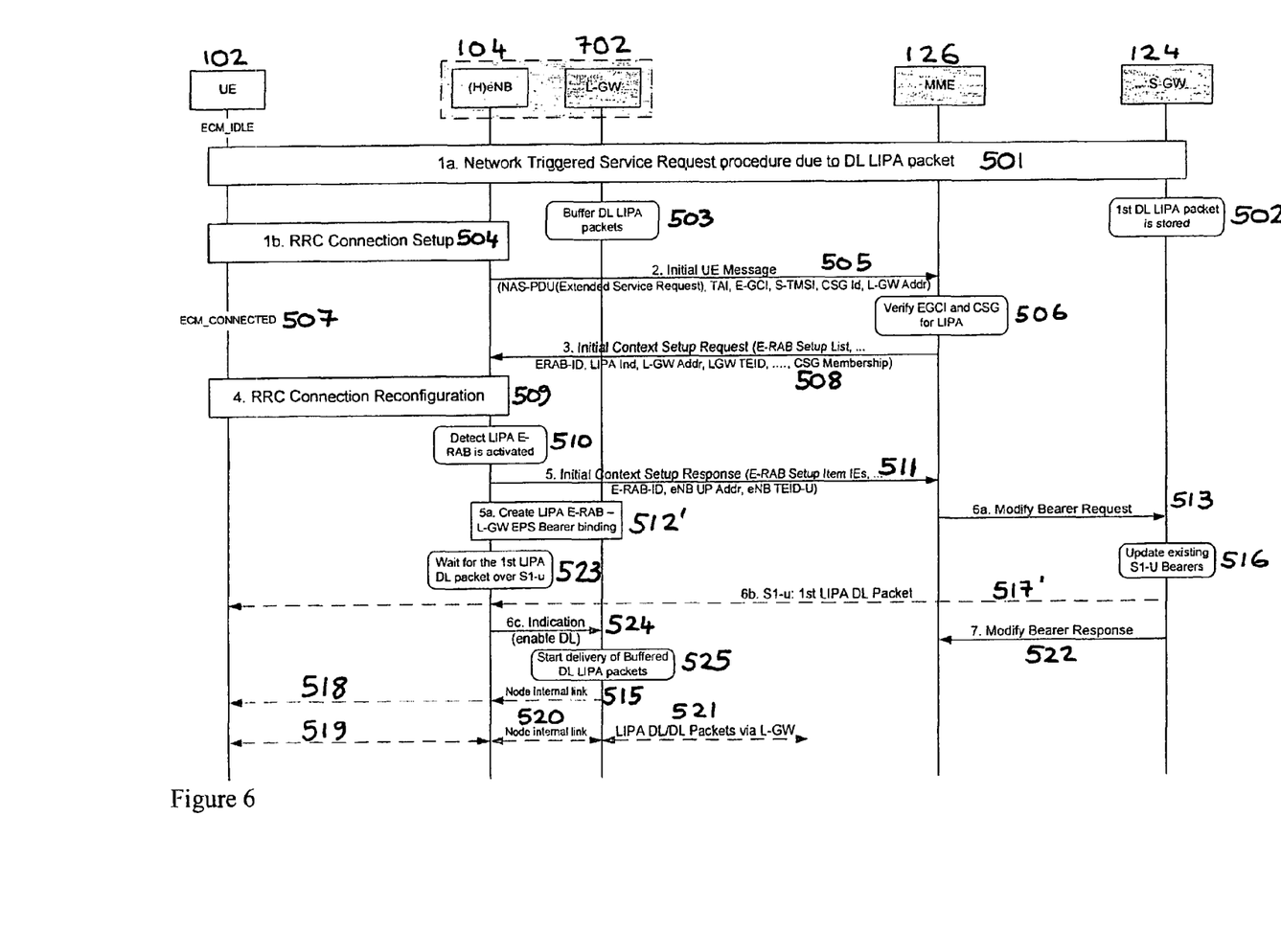
FIG. 6 illustrates a signalling diagram according to some embodiments.

Reference is made to FIG. 6 which shows the LIPA downlink packet in sequence delivery after the UE is paged, according to an embodiment. Those processes, steps and/or signalling which are the same as shown in FIG. 5 are referenced by the same reference numeral.

It should be appreciated that steps/procedures/signalling referenced 501 to 511 are as described in relation to FIG. 5 and will not be described again.

As referenced 512, the HeNB establish a node internal direct link towards the L-GW and creates a binding in between the user equipment's LIPA E-RAB context in the HeNB and the EPS bearer context in the L-GW. However, initially, the HeNB shall configure the node internal link towards the L-GW so that data transfer is enabled only in the uplink direction. Thus, the L-GW cannot deliver its buffered LIPA downlink packets at this stage but may receive uplink packets. The HeNB may receive uplink packets for a LIPA E-RAB from the user equipment if the user equipment triggered service request is activated responsive to user equipment activity. However, this may not be the usual case after the LIPA downlink paging where the service request is triggered by the network.

As referenced 523, the HeNB shall wait for the first LIPA downlink packet over the S1-u. It should be appreciated that responsive to the signalling referenced 511, the signalling 513 and procedure 516 of FIG. 5 are also carried out in the signalling illustrated in FIG. 6.

When the HeNB receives the first LIPA downlink packet, the HeNB shall forward it immediately to the user equipment by using the radio bearer that is associated to the LIPA E-RAB service. This is referenced 517'.

Responsive to this, the HeNB 104 will send an indication to the L-GW indicating that the first packet has been received. This will enable the downlink direction data transfer. This is referenced 524.

As referenced 525, the L-GW 702 will start delivery of the buffered downlink LIPA packages. Thus, the L-GW starts forwarding its buffered LIPA downlink packets to the HeNB by using the node internal link. This is referenced 515 and is generally described as described in relation to FIG. 5. The HeNB shall forward these packets to the user equipment by using the radio bearer that is associated to the LIPA E-RAB service, as referenced 518.

It should be appreciated that signalling 521, 520 and 519 can then take place as described in relation to FIG. 5.

Figure 8:
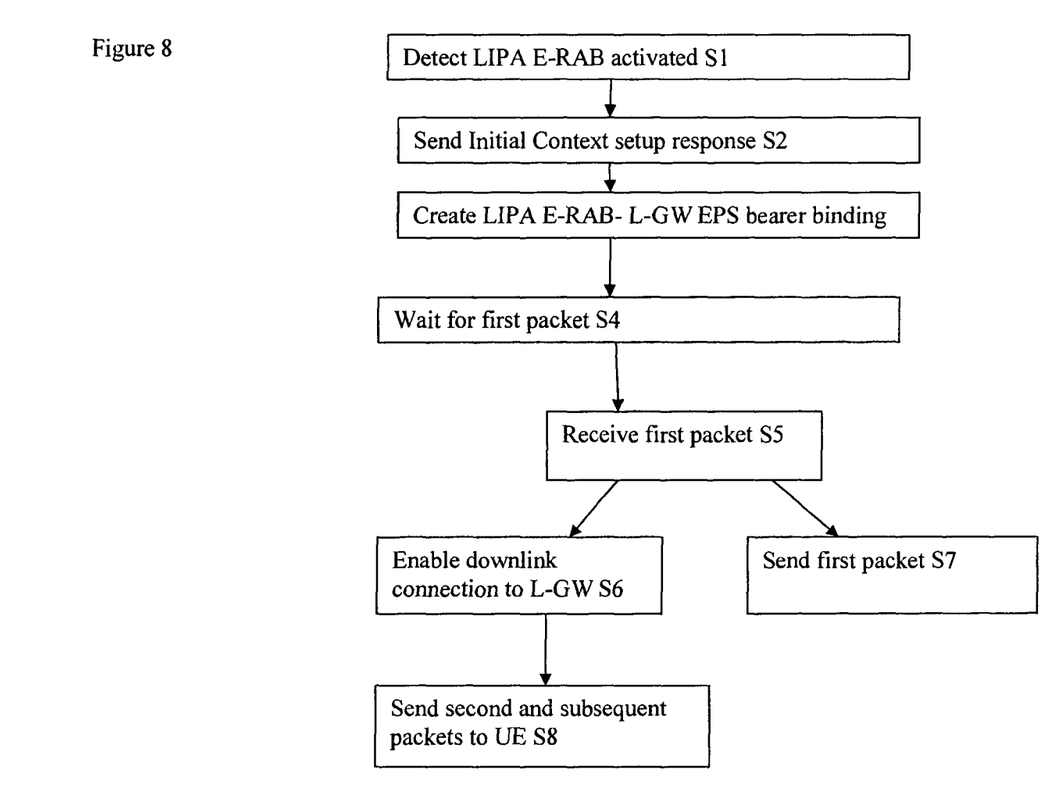
FIG. 8 schematically shows the method steps performed by a HeNB in an embodiment.

Reference is made to FIG. 8 which shows the processing performed by a HeNB in one embodiment.

In step S1, the HeNB detects that the LIPA E-RAB has been activated.

In step S2, the HeNB will cause the initial context set response to be sent to the MME.

In step S3, the HeNB will set up the node internal link to the L-GW and create the binding between the UE's LIPA E-RAB context in the HeNB and the EPS bearer context in the L-GW. However this link is enabled only in the uplink direction.

In step S4, the HeNB waits for the first downlink LIPA packet.

In step S5, the HeNB receives the first downlink LIPA packet.

In step S6, the HeNB enables the downlink connection between the HeNB and L-GW.

In step S7, the HeNB sends the first downlink LIPA packet to the UE. This step may take place in parallel with step S6.

In step S8, the HeNB sends the second and subsequent downlink LIPA packets to the UE.

It should be appreciated that at least one or more of the steps performed by the HeNB may be carried out at least partially by one or more data processors. The one or more processor may carry out one or more of the steps or cause one or more steps to be performed. The one or more processor may operate in conjunction with one or more memories.

In embodiments of the invention, the first LIPA downlink packet received from the S-GW is delivered as the first packet to the user equipment and the following packets that arrive over the node internal link can be ordered using a simple FIFO buffering mechanism. This means that no complicated numbering of packets at the transport protocol layer is required as previously proposed.

It should be noted that embodiments have been described where the L-GW is co-located with the HeNB. It should be appreciated that embodiments may also be applied to a stand-alone L-GW. In place of the node internal link there would be a physical interface between the HeNB and the L-GW nodes. Again, in this arrangement, the HeNB will wait for the first LIPA downlink packet from the S-GW so that it establishes a connection towards the stand-alone L-GW so that only uplink data transfer is enabled initially. The HeNB will send an indication message to the L-GW when the first LIPA downlink packet is received in order to enable data transfer in the downlink for the remaining downlink packets.

In the above embodiments, the HeNB may record that the E-RAB was established after a paging, i.e. there is a downlink packet waiting for delivery in the S-GW. If the HeNB does not record this, then the first downlink packet will be sent via the SGW if there is a UE initiated service request.

In an alternative embodiment, the HeNB will create both the downlink and uplink path on reception of a first packet regardless of where the packet is received from. Generally, in the case of a network initiated service request, the first packet may be the first downlink packet from the SGW and not an uplink packet from the UE. This arrangement may be advantageous in that the HeNB does not need to record the paging performed earlier which can simplify the HeNB.

In one embodiment, the interface between the HeNB and the L-GW entities may be managed by the HeNB and may be implemented in HeNB software. However, in alternative embodiments, the L-GW may manage a connection and management may be implemented in the L-GW software. In some embodiments, the management may be carried out by both the HeNB and the L-GW together. In yet another embodiment, the management may be carried out by a control entity which may be separate from the HeNB.

In some embodiments, the interface between the L-GW and the HeNB may be a node internal link as the L-GW is physically co-located in the HeNB node.

In alternative embodiments, this interface may be a node external link as a separate stand-alone L-GW node may be supported.

In one modification the uplink and downlink connections between the L-GW and the HeNB are set up before the first packet is received. When the first packet is received by the HeNB, the HeNB sends a message to the L-GW requesting the second and subsequent packets. The L-GW will only forward these packets to the HeNB when the L-GW has received that message from the HeNB.

Embodiments of the invention mean that the LIPA downlink packet and sequence delivery requirement may be met with a simple implementation. This may be of an advantage with cost sensitive home base stations.

Some embodiments may be compatible with TS 23.401 which has a mechanism for sending the first LIPA downlink packet via the S-GW and the delivery of the first LIPA packet over the S1-u interface to the HeNB has been specified. Some embodiments may not require any changes in the S-GW due to LIPA feature.

In one modification, the L-GW stores a copy of the first downlink LIPA packet along with the remaining packets which are buffered.

It should be appreciated that embodiments of the invention may be used with the home node B subsystem for UTRAN.

It is noted that whilst embodiments have been described in relation to LTE-Advanced, similar principles can be applied to any other communication system.

It should be appreciated that although the figures shows one order for the signalling flow, it should be appreciated that the order and/or relative timing of the signalling may be changed in some embodiments.

Although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments there are several variations and modifications which may be made to the disclosed solution without departing from the scope of the present invention.

It is noted that whilst embodiments have been described in relation to HeNBs, similar principles can be applied to any other type of access node.

The required data processing apparatus and functions of a base station apparatus, a mobile communication device and any other appropriate station may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some features may be implemented in hardware, while other features may be implemented in firmware or software which may be executed by a controller, microprocessor or other computing device, although the embodiments are not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A method comprising:
   responsive to receiving, from a first gateway device over a downlink channel, a first packet of a plurality of packets at a first radio access node collocated with a second gateway associated with a home network enabling said first radio access node to receive at least one other of said plurality of packets via the second gateway device;
   buffering all of at least one other of said plurality of packets at the second gateway, wherein buffering the first packet causes a user equipment of the home network to be paged to establish a connection with the home network; and
   based on the paging, causing said buffered plurality of packets to be forwarded to the user equipment in a sequence comprising: causing said first packet to be forwarded by said first radio access node to the user equipment before said at least one other of said plurality of packets is caused to be forwarded to said user equipment, wherein said plurality of packets comprises downlink local IP access packets, and wherein said causing further comprises:
   configuring a link as an uplink link comprising creating a binding between a local IP access packet bearer for the user equipment and a bearer context associated with said second gateway device;
   sending an indication of the received first packet to the second gateway device using the uplink link, wherein responsive to said indication there is causing said at least one other packet to be received by said first radio access node from said second gateway;
   configuring the link as a downlink link, and using the downlink link to forward said at least one other of the plurality of packets in said sequence to said user equipment; and
   storing said at least one other of said plurality of packets in said second gateway device until said first radio access node has received said first of said plurality of packets.

2. The method as claimed in claim 1, wherein the user equipment is in an idle state when the plurality of packets is received, and wherein based on at least the paging the user equipment is caused to change from the idle state to a connected state to receive the at least one other of the plurality of packets.

3. The method as claimed in claim 1, wherein said first gateway device comprises a serving gateway device.

4. The method as claimed in claim 1, wherein said forwarding said at least one other of said plurality of packets in sequence is based on a first in first out buffering mechanism of the buffer.

5. The method as claimed in claim 1, wherein said second gateway device comprises a local gateway device.

6. The method as claimed in claim 1, wherein said second gateway device is a standalone gateway device.

7. The method as claimed in claim 1, wherein said storing comprises storing said at least one other of said plurality of packets in a first in first out manner.

8. The method as claimed in claim 1, comprising causing said first packet to be forwarded by said first radio access node to said user equipment before said link configuration is enabled.

9. The method as claimed in claim 1, wherein said uplink link is configured before causing said first packet to be forwarded to said user equipment.

10. A non-transitory computer readable medium embodying a computer program comprising computer executable instructions, in which the computer program is executed by a processor to perform the method of claim 1.

11. The method as claimed in claim 1, wherein the downlink channel comprises an S1-u downlink channel, and wherein the local IP access packet bearer comprises a local IP evolved universal terrestrial radio access network bearer.

12. An apparatus comprising
at least one processor and
at least one memory including computer program code, the at least one memory and computer program code configured to with the at least one processor cause the apparatus at least to:
responsive to receiving, from a first gateway device over a downlink channel, a first packet of a plurality of packets, enabling said apparatus to receive at least one other of said plurality of packets via a second gateway device associated with a home network;
buffer all of at least one other of said plurality of packets at the second gateway device, wherein buffering the first packet causes a user equipment of the home network to be paged to establish a connection with the home network; and
based on the paging, cause said buffered plurality of packets to be forwarded to the user equipment in a sequence comprising: causing said first packet to be forwarded to the user equipment before said at least one other of said plurality of packets is caused to be forwarded to said user equipment, and wherein said plurality of packets comprises downlink local IP access packets, and wherein said causing further comprises:
configuring a link as an uplink link comprising a binding between a local IP access packet bearer for the user equipment and a bearer context associated with said second gateway device;
sending an indication of the received first packet to the second gateway device using the uplink link, wherein responsive to said indication there is causing said at least one other packet to be received by said first radio access node from said second gateway;
configuring the link as a downlink link, and using the downlink link to forward said at least one other of the plurality of packets in said sequence to said user equipment; and
storing said at least one other of said plurality of packets in said second gateway device until said first radio access node has received said first of said plurality of packets.

13. The apparatus as claimed in claim 12, wherein said forwarding said at least one other of said plurality of packets in the sequence is based on a first in first out buffering mechanism of the buffer.

14. The apparatus as claimed in claim 12, wherein said at least one memory and computer program code is configured to with the at least one processor cause the apparatus to cause said first packet to be forwarded to said user equipment before said link configuration is enabled.

15. The apparatus as claimed in claim 12, wherein said at least one memory and computer program code is configured to with the at least one processor cause the apparatus to configure said uplink link before causing said first packet to be forwarded to said user equipment.

16. A base station comprising an apparatus as claimed in claim 12.

* * * * *